United States Patent
Szczerba et al.

(10) Patent No.: US 8,098,171 B1
(45) Date of Patent: Jan. 17, 2012

(54) TRAFFIC VISIBILITY IN POOR VIEWING CONDITIONS ON FULL WINDSHIELD HEAD-UP DISPLAY

(75) Inventors: Joseph F. Szczerba, Grand Blanc, MI (US); Thomas A. Seder, Northville, MI (US); Dehua Cui, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/979,432

(22) Filed: Dec. 28, 2010

(51) Int. Cl.
*G08B 21/00* (2006.01)

(52) U.S. Cl. ........................ 340/905; 340/438
(58) Field of Classification Search .............. 340/438, 340/905, 988–996; 345/7–9; 353/13, 14
See application file for complete search history.

(56) References Cited

U.S. PATENT DOCUMENTS

| | | | |
|---|---|---|---|
| 6,986,581 B2 | 1/2006 | Sun et al. | |
| 7,090,355 B2 | 8/2006 | Liu et al. | |
| 7,182,467 B2 | 2/2007 | Liu et al. | |
| 7,213,923 B2 | 5/2007 | Liu et al. | |
| 7,460,951 B2 | 12/2008 | Altan et al. | |
| 7,796,056 B2 * | 9/2010 | Fein et al. | 340/995.24 |
| 2008/0158096 A1 * | 7/2008 | Breed | 345/7 |
| 2008/0158510 A1 | 7/2008 | Tant et al. | |
| 2009/0268946 A1 | 10/2009 | Zhang et al. | |
| 2010/0253489 A1 | 10/2010 | Cui et al. | |
| 2010/0253492 A1 | 10/2010 | Seder et al. | |
| 2010/0253493 A1 | 10/2010 | Szczerba et al. | |
| 2010/0253526 A1 | 10/2010 | Szczerba et al. | |
| 2010/0253539 A1 | 10/2010 | Seder et al. | |
| 2010/0253540 A1 | 10/2010 | Seder et al. | |
| 2010/0253541 A1 | 10/2010 | Seder et al. | |
| 2010/0253542 A1 | 10/2010 | Seder et al. | |
| 2010/0253543 A1 | 10/2010 | Szczerba et al. | |
| 2010/0253593 A1 | 10/2010 | Seder et al. | |
| 2010/0253594 A1 | 10/2010 | Szczerba et al. | |
| 2010/0253595 A1 | 10/2010 | Szczerba et al. | |
| 2010/0253596 A1 | 10/2010 | Szczerba et al. | |
| 2010/0253597 A1 | 10/2010 | Seder et al. | |
| 2010/0253599 A1 | 10/2010 | Szczerba et al. | |
| 2010/0253600 A1 | 10/2010 | Seder et al. | |
| 2010/0253601 A1 | 10/2010 | Seder et al. | |
| 2010/0253602 A1 | 10/2010 | Szczerba et al. | |
| 2010/0253688 A1 | 10/2010 | Cui et al. | |
| 2010/0253918 A1 | 10/2010 | Seder et al. | |
| 2010/0254019 A1 | 10/2010 | Cui et al. | |

OTHER PUBLICATIONS

U.S. Appl. No. 12/467,340, Szczerba et al.
U.S. Appl. No. 12/467,350, Seder et al.
U.S. Appl. No. 12/900,566, Szczerba et al.
U.S. Appl. No. 12/900,539, Szczerba et al.
U.S. Appl. No. 12/903,267, Szczerba et al.
U.S. Appl. No. 12/980,503, Szczerba et al.

(Continued)

*Primary Examiner* — Jeffery Hofsass

(57) ABSTRACT

A method to dynamically register a graphic onto a driving scene of a vehicle utilizing a substantially transparent windscreen head-up display includes monitoring driving viewing conditions of the vehicle, detecting poor viewing conditions based on the monitored driving viewing conditions, monitoring a traffic pattern location, determining a graphic representing the traffic pattern location based on the monitored traffic pattern location and the detected poor viewing conditions, dynamically registering a location of the graphic upon the substantially transparent windscreen head-up display corresponding to the driving scene of the vehicle, and displaying the graphic upon the substantially transparent windscreen head-up display at said location, wherein the substantially transparent windscreen head-up display includes one of light emitting particles or microstructures over a predefined region of the windscreen permitting luminescent display while permitting vision therethrough.

17 Claims, 3 Drawing Sheets

OTHER PUBLICATIONS

U.S. Appl. No. 12/980,522, Szczerba et al.
U.S. Appl. No. 12/980,612, Szczerba et al.
U.S. Appl. No. 12/981,206, Szczerba et al.
U.S. Appl. No. 12/981,602, Szczerba et al.
U.S. Appl. No. 12/982,478, Szczerba et al.

* cited by examiner

US 8,098,171 B1

TRAFFIC VISIBILITY IN POOR VIEWING CONDITIONS ON FULL WINDSHIELD HEAD-UP DISPLAY

TECHNICAL FIELD

This disclosure is related to graphical imaging representing a traffic pattern location during poor viewing conditions upon a windscreen in a motor vehicle.

BACKGROUND

The statements in this section merely provide background information related to the present disclosure and may not constitute prior art.

Driving capabilities may be enhanced when a vehicle operator is aware of the traffic pattern surrounding the vehicle. However, the operator is not visually capable of viewing all surroundings outside of a vehicle when viewing conditions are poor, such as during fog, rain, snow and darkness. Awareness of traffic patterns can be vastly diminished during poor viewing conditions.

Head-up displays project light upon a screen and the light is converted into a viewable display upon the screen. Head-up displays are known to present information to the operator of the vehicle in an effective manner by reducing strain upon the operator while allowing the operator to remain focused on driving.

SUMMARY

A method to dynamically register a graphic onto a driving scene of a vehicle utilizing a substantially transparent windscreen head-up display includes monitoring driving viewing conditions of the vehicle, detecting poor viewing conditions based on the monitored driving viewing conditions, monitoring a traffic pattern location, determining a graphic representing the traffic pattern location based on the monitored traffic pattern location and the detected poor viewing conditions, dynamically registering a location of the graphic upon the substantially transparent windscreen head-up display corresponding to the driving scene of the vehicle, and displaying the graphic upon the substantially transparent windscreen head-up display at said location, wherein the substantially transparent windscreen head-up display includes one of light emitting particles or microstructures over a predefined region of the windscreen permitting luminescent display while permitting vision therethrough.

BRIEF DESCRIPTION OF THE DRAWINGS

One or more embodiments will now be described, by way of example, with reference to the accompanying drawings, in which.

DETAILED DESCRIPTION

Figure 1:
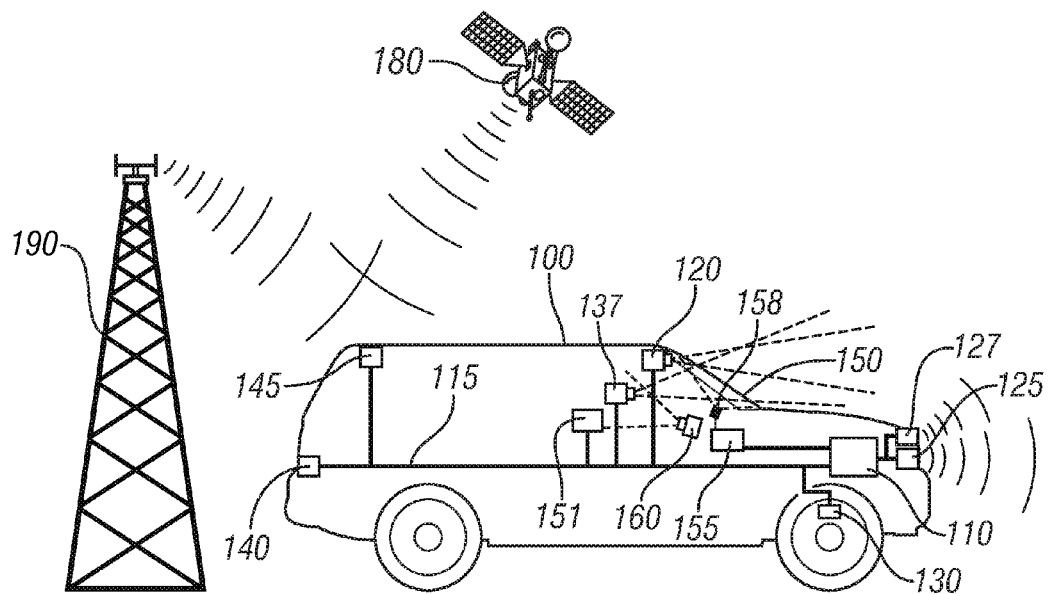
FIG. 1 illustrates an exemplary vehicle equipped with an EVS system, in accordance with the present disclosure.

Referring now to the drawings, wherein the showings are for the purpose of illustrating certain exemplary embodiments only and not for the purpose of limiting the same, a method and an enhanced vision system (EVS) to represent graphical images upon a windscreen of a vehicle representing a traffic pattern location during poor viewing conditions is disclosed. The graphical images are derived from sensor and/or data inputs monitoring the traffic pattern location by processing of the inputs and providing a representation of the traffic pattern location to the operator or occupants of the vehicle when viewing conditions are poor. Graphical images to be displayed upon the windscreen are dynamically registered to a location upon the windscreen corresponding to a driving scene of the vehicle, such that an intended operator or occupant of the vehicle may view the other vehicles and the registered graphical image representing the traffic pattern location as a single discernable input.

FIG. 1 illustrates an exemplary vehicle equipped with an EVS system, in accordance with the present disclosure. An exemplary EVS system is disclosed in co-pending U.S. application Ser. No. 12/417,077, which is incorporated herein by reference. Vehicle 100 includes an EVS system manager 110; vehicle sensor systems, including camera system 120, lidar system 127, infrared (IR) imaging device 137 and radar system 125; vehicle operation sensors, including vehicle speed sensor 130; information systems, including GPS device 140 and wireless communication system 145; head-up display (HUD) 150; human machine interface (HMI) 151; EVS graphics system 155; graphics projection system 158; and occupant eye location sensing system 160. The EVS system manager 110 includes a programmable processor including programming to monitor various inputs and represent the traffic pattern location to the vehicle 100 to display upon the HUD 150 during poor viewing conditions. The EVS system manager 110 can communicate directly with various systems and components, or the EVS system manager 110 can alternatively or additionally communicate over a LAN/CAN system 115. The EVS system manager 110 utilizes information regarding the operational environment of the vehicle 100 derived from a number of inputs. Camera system 120 includes a camera or image capturing device taking periodic or sequential images representing a view from the vehicle. The camera or image capturing device of the camera system 120 preferably includes 360 degrees of coverage. Lidar system 127 includes a device known in the art utilizing scattered light to find range and/or other information of other vehicles located near the vehicle. IR imaging device 137 includes a device known in the art utilizing thermal imaging cameras to detect radiation in the infrared range of the electromagnetic spectrum and produce images of that radiation corresponding to other vehicles. Images from the IR imaging device 137 and the camera system 120 can be referred to as image data. Radar system 125 includes a device known in the art utilizing electromagnetic radiation to detect other vehicles or objects located near the vehicle. The data from the radar system 125 and the lidar system 127 can be referred to as range data. A number of known in-vehicle sensors are used within a vehicle to monitor vehicle speed, engine speed, wheel slip, and other parameters representative of the operation of the vehicle. Vehicle speed sensor 130 represents one such an in-vehicle sensor, but the scope of the disclosure includes any such sensors for use by the EVS. GPS device 140 and wireless communication system 145 communicate with resources outside of the vehicle, for example, satellite system 180 and cellular communications tower 190. Data from the internet can be obtained from the wireless communication system 145. GPS device 140 may be utilized in conjunction with a 3D map database including detailed information relating to a global coordinate received by the GPS device 140 regarding the current location of the vehicle. Information from the vehicle sensor systems and the vehicle operation sensors can be utilized by the EVS system manager 110 to monitor the current location and orientation of the vehicle. HUD 150 includes a windscreen equipped with features capable of displaying an image projected thereupon while remaining transparent or substantially transparent such that occupants of the vehicle can clearly observe outside of the vehicle through the windscreen. One will appreciate that while HUD 150 includes the windscreen in the front of the vehicle, other surfaces within the vehicle could be used for projection, including side windows and a rear window. Additionally, the view on the front windscreen could be continued upon the front vehicle "A-pillars" and onto the side windows as a continuous image. HMI 151 includes a computing device where the operator of the vehicle can input commands to control various systems of the vehicle in signal communication with the HMI 151 and receive desirable information. For instance, utilizing the HMI 151, the operator can input requests to other vehicles (i.e., vehicle to vehicle communication) to monitor the location of the other vehicles (e.g., monitor the traffic pattern location). EVS graphics engine 155 includes display software or programming translating requests to display information from the EVS system manager 110 in graphical representations of the information. The EVS graphics engine 155 includes programming to compensate for the curved and tilted surface of the windscreen and any other surfaces onto which graphics are to be projected. EVS graphics engine 155 controls graphics projection system 158 including a laser or projector device producing an excitation light to project the graphical representations. Occupant eye location sensing system 160 includes sensors known in the art to approximate a location of the head of an occupant and further the orientation or gaze location of the eyes of the occupant. Based upon the output of the occupant eye location sensing system 160, the current orientation of the vehicle 100 and input data tracking location information regarding the environment around the vehicle (e.g., traffic pattern location), EVS system manager 110 can accurately dynamically register the graphical representations to the HUD such the occupant sees the images overlaid with visual images through the windscreen.

The EVS described above includes eye sensing and head sensing devices allowing estimation of eye location, allowing dynamic registration of images upon the HUD such that the images correspond to a view of the operator. However, it will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate registration of graphics upon the HUD are contemplated, and the disclosure is not intended to be limited to the particular embodiments described herein.

An exemplary EVS includes a wide field of view, full windscreen HUD, a substantially transparent screen including functionality to display graphical images projected thereupon; a HUD image engine including a laser or lasers capable of projecting images upon the windscreen; input sources deriving data concerning the operating environment of the vehicle; and an EVS system manager including programming to monitor inputs from the input devices, process the inputs and determine critical information relative to the operating environment, and create requests for graphical images to be created by the HUD image engine. However, it will be appreciated that this exemplary EVS is only one of a wide number of configurations that an EVS can take. For example, a vision or camera system is useful to various EVS applications that will be discussed. However, it will be appreciated that an exemplary EVS system can operate without a vision system, for example, providing information available from only a GPS device, 3D map database, and in-vehicle sensors. In the alternative, it will be appreciated that an exemplary EVS system can operate without access to a GPS device or wireless network, instead utilizing inputs only from a vision system and radar system. Many various configurations are possible with the disclosed systems and methods, and the disclosure is not intended to limited to the exemplary embodiments described herein.

Figure 2:
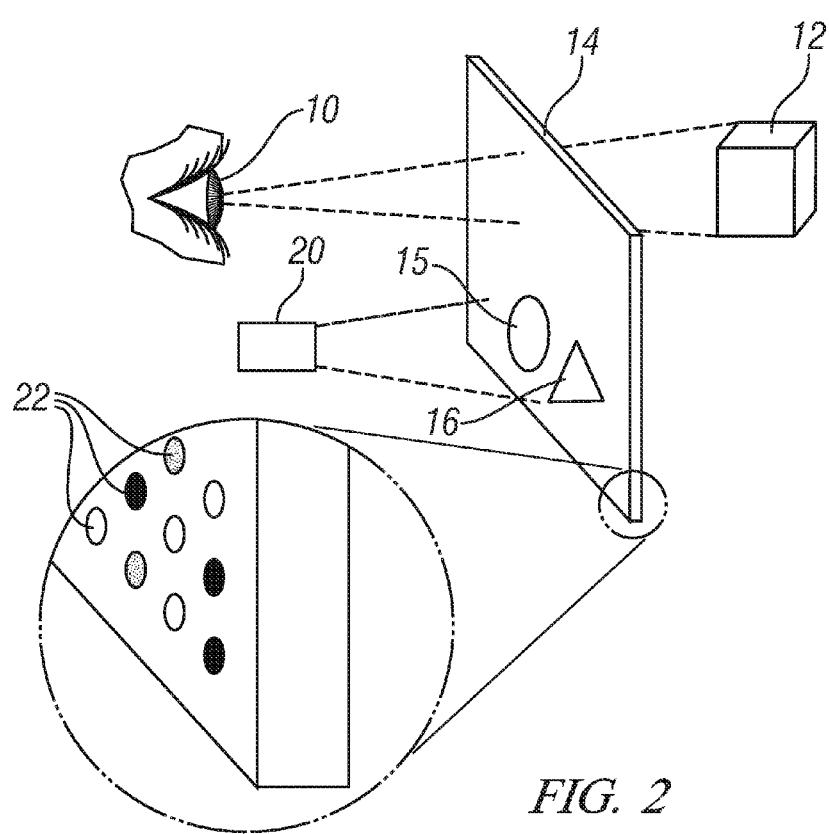
FIG. 2 illustrates a substantially transparent display, in accordance with the present disclosure.

In order to function as a medium through which relevant features are observable while serving as a display device upon which the graphical images may be displayed, the windscreen of the vehicle must be both transparent and capable of displaying images projected by an excitation light source. FIG. 2 illustrates a substantially transparent display, in accordance with the present disclosure. Viewer 10 is able to see an arbitrary object (e.g. cube 12) through substrate 14. Substrate 14 may be transparent or substantially transparent. While viewer 10 sees arbitrary object 12 through substrate 14, the viewer can also see images (e.g. circle 15 and triangle 16) that are created at substrate 14. Substrate 14 may be part of a vehicle windshield, a glass substrate, a plastic substrate, a polymer substrate, or other transparent (or substantially transparent) medium that would be appreciated by one of ordinary skill in the art. Other substrates may complement substrate 14 to provide for tinting, substrate protection, light filtering (e.g. filtering external ultraviolet light), and other functions.

FIG. 2 illustrates illumination of substrate 14 illuminated with excitation light (e.g. ultraviolet light or infrared light) from light sources (e.g. a projector or laser), depicted by device 20. The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

In one embodiment, the excitation light is output by device 20 including a projector. The projector may be a digital projector. The projector may be a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. The projector is a liquid crystal display (LCD) projector. The projector may be a liquid crystal on silicon (LCOS) projector. The projector may be an analog projector (e.g. a slide film projector or a movie film projector). One of ordinary skill in the art would appreciate other types of projectors which may be used to project ultraviolet light on substrate 14.

In another embodiment, an excitation light is output from device 20, including a laser. The intensity and/or movement of a laser beam output from device 20 may be modulated to create an image in substrate 14. In down-conversion embodiments, the output from the laser may be ultraviolet light. In up-conversion embodiments, the output from the laser may be infrared light.

FIG. 2 illustrates light emitting material (e.g. light emitting particles 22) dispersed in a substantially transparent substrate. When excitation light is absorbed by the light emitting particles 22, the light emitting particles emit visible light. Accordingly, in down-conversion embodiments, when ultraviolet light is absorbed by light emitting particles 22, visible light is emitted from the light emitting particles. Likewise, in up-conversion embodiments, when infrared light is absorbed by light emitting particles 22, visible light is emitted from the light emitting particles.

FIG. 2 illustrates light emitting material, including light emitting particles 22, dispersed in a substantially transparent substrate. These light emitting particles 22 can be substantially similar particles throughout, or, as illustrated in FIG. 2, the particles can vary in composition. When excitation light is absorbed by the light emitting particles 22, the particles emit visible light. Accordingly, in down-conversion embodiments, when ultraviolet light is absorbed by light emitting particles, visible light is emitted from the light emitting particles. Likewise, in up-conversion embodiments, when infrared light is absorbed by light emitting materials, visible light is emitted from the light emitting particles. Each light emitting particle may be a different type of light emitting material, which emits a different range of wavelengths of visible light in response to a different range of wavelengths of excitation light (e.g. ultraviolet or infrared light).

Light emitting particles 22 may be dispersed throughout substrate 14. In the alternative, as illustrated in FIG. 2, the particles may be disposed on a surface of substrate 14. Light emitting particles 22 may be integrated into substrate 14 by being coated on substrate 14. Light emitting material may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. Each of the light emitting particles may have a diameter that is less than about 400 nanometers. According to embodiments, each of the light emitting particles may have a diameter that is less than about 300 nanometers, less than about 200 nanometers, less than about 100 nanometers, or less than about 50 nanometers. The light emitting particles may be individual molecules.

Figure 3:
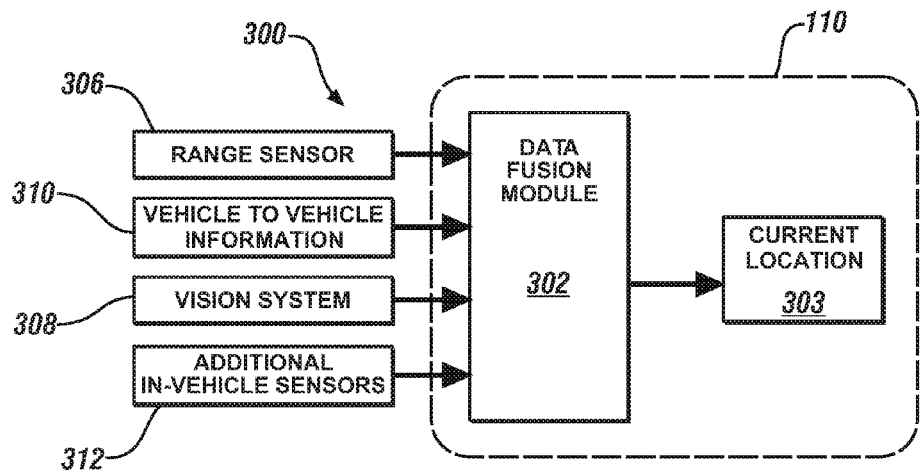
FIG. 3 illustrates an exemplary target tracking system whereby sensor inputs are fused to continuously determine a current location of a remote or target object being tracked, in accordance with the present disclosure.

FIG. 3 schematically illustrates the exemplary target tracking system 300 whereby sensor inputs are fused to continuously determine the current location 303 of a remote or target object being tracked. Inputs related to target objects in an environment around the vehicle are monitored by a data fusion module 302. The data fusion module 302 analyzes, filters, or prioritizes the inputs relative to the reliability of the various inputs, and the prioritized or weighted inputs are summed to determine the current location of the target object.

The data fusion module 302 is useful to integrate input from various sensing devices and generate a fused track of the target object to determine the current location of the target object. The fused track includes a data estimate of relative location and trajectory of the target object relative to the vehicle. This data estimate, based upon range sensors 306 including radar, lidar and other range finding sensor inputs is useful, but includes the inaccuracies and imprecision of the sensor devices utilized to create the track. As described above, different sensor inputs can be utilized in unison to improve accuracy of the estimates involved in determining the current location of the target object (e.g., monitoring the current location of a traffic pattern).

Vision systems provide an additional or alternate source of sensor input for use in the target tracking system 300. Pattern recognition, corner detection, vertical edge detection, vertical object recognition, and other methods may be used in analyzing visual information. However, it will be appreciated that high-resolution visual representations of the field in front a vehicle refreshing at a high rate necessary to appreciate motion in real-time include a very large amount of information to be analyzed. Thus, it is desirable to fuse input from the vision system 308 with range sensors 306 to focus vision analysis upon a portion of the visual information most likely to determine the current location of the target object.

Additional in-vehicle sensors 312 providing, for example, infrared and ultrasonic information can be utilized with the data fusion module 302 of the target tracking system 300 to determine the current location 303 of the target object.

Further, vehicle to vehicle information 310 can be utilized to determine the current location 303 of the target object when the target object is another vehicle. When the target object is a second vehicle, the second vehicle communicates its current location to the control system (e.g., EVS system manager 110) of a first vehicle (e.g., the vehicle). The current location communicated by the second vehicle can include the second vehicle providing GPS coordinates in conjunction with 3D map data to the first vehicle. The vehicle to vehicle information 310 can be used alone or can be used in the fusion module 302 with the various sensing devices to generate the fused track of the target object to determine the current location 303 of the target object.

It should further be appreciated that the data fusion module 302 of FIG. 3 can be utilized to continuously monitor the surrounding environment using its range sensors (e.g., radar and lidar), cameras, IR imaging devices and vehicle to vehicle communication to take appropriate counter-measurements in order to avoid incidents or situations to develop into a collision by assessing the input from the sensing devices. An exemplary trajectory fusing process, disclosed in U.S. Pat. No. 7,460,951 and incorporated herein by reference, permits determining position of a target object in the XY-coordinate system relative to the vehicle. Likewise, object tracks can be utilized for a variety of purposes including adaptive cruise control, wherein the vehicle adjusts speed to maintain a minimum distance from vehicles in the current path. Another similar system wherein object tracks can be utilized is a collision preparation system (CPS), wherein identified object tracks are analyzed in order to identify a likely impending or imminent collision based upon the track motion relative to the vehicle. A CPS warns the driver of an impending collision and reduces collision severity by automatic braking if a collision is considered to be unavoidable.

All of the mentioned inputs can be utilized by the exemplary EVS system manager 110. Additionally, it will be appreciated that the EVS system manager 110 may employ methods described above related to target tracking to determine the current location of the target object, wherein the target object can be a traffic pattern location.

It will be further appreciated that the target tracking system 300 whereby sensor inputs are fused to continuously determine the current location 303 of a remote or target object being tracked can be utilized in conjunction with vehicular environment data inputs 402 monitoring the current traffic pattern location. The vehicular environment data inputs 402 will be discussed in greater detail below in FIG. 4 of the present disclosure.

A graphic may be dynamically registered onto a driving scene of a vehicle utilizing a substantially transparent windscreen HUD, wherein the graphic represents a traffic pattern location when poor viewing conditions are detected. Dynamically registering the graphic onto the driving scene of the vehicle requires monitoring data related to an occupant eye location (and/or head location), monitoring a current orientation of the vehicle, monitoring a current location of the vehicle and monitoring a current location of a target object (e.g., the traffic pattern location). With reference to FIGS. 1 and 3, the occupant eye location sensing system 160 includes sensors known in the art to approximate a location of the head of an occupant and further the orientation or gaze location of the eyes of the occupant. An occupant can be an operator of the vehicle or a passenger within the vehicle. Head and eye sensing devices are known in the art and will not be discussed in great detail here. For the purposes of this disclosure, a camera based device is utilized in combination with image recognition software to estimate a three-dimensional head location within the vehicle, able to be coordinated with a vehicle coordinate system, and a direction of occupant's gaze based upon image recognition programming.

The current orientation of the vehicle can be determined by methods known in the art such as, but not limited to, monitoring the GPS device 140 in conjunction with a 3D map database and a digital compass including detailed information relating to a global coordinate received by the GPS device 140 regarding the current location of the vehicle. The current orientation can also be determined by vehicle kinematics including at least vehicle speed and yaw rate, available through sensors monitoring vehicle operation and/or monitoring accelerometer readings.

The current location of the target object can be monitored by analyzing the data obtained by the target tracking system 300 described above, where one or more sensors are used in conjunction with each other to monitor the current location of the target object. For instance, vehicle sensor systems including camera system 120 and radar system 125 can fuse collected information to monitor the current location of the target object. Likewise, vehicle to vehicle communication can be utilized where the target object is a second vehicle that continuously conveys its current location back to the vehicle (e.g., conveys GPS information in conjunction with 3D map data).

Based on the occupant eye location, the current orientation of the vehicle and the current location of the target object (e.g., the traffic pattern location), an estimated point of intersection between the tracked object (e.g., the traffic pattern location) and the operator's eyes can be determined upon the windscreen, thereby enabling graphical images to be dynamically registered to a location upon the windscreen corresponding to the driving scene of the vehicle, such that the occupant of the vehicle may view the traffic pattern location and the registered graphical image representing the traffic pattern location as a single discernable input. However, it will be appreciated that the traffic pattern location may be completely or partially obstructed due to poor viewing conditions.

It will be further appreciated that the dynamically registered graphics can be updated based upon the occupant's gaze location. As will be described in more detail below with specific examples, emphasis to the registered graphic can be enhanced or decreased based on the distance between the occupant's gaze location and the identified potential roadway hazard on the driving scene. For instance, as the occupant's gaze location from the dynamically registered graphic increases, emphasis may be added to the graphic to gain the occupant's attention because it may be evident the occupant is looking away from the graphic. However, if the occupant's gaze location from the graphic decreases, emphasis may be reduced to the graphic because it may be evident the occupant is looking at or near the graphic. Likewise, if the graphic is textual in nature, as the occupant's gaze location decreases, emphasis may be added to the textual graphic to clarify the text because it may be evident the occupant is looking at the graphic and attempting to read the text. Emphasis can include increasing or decreasing illumination of the graphic and/or flashing or pulsating the graphic.

Figure 4:
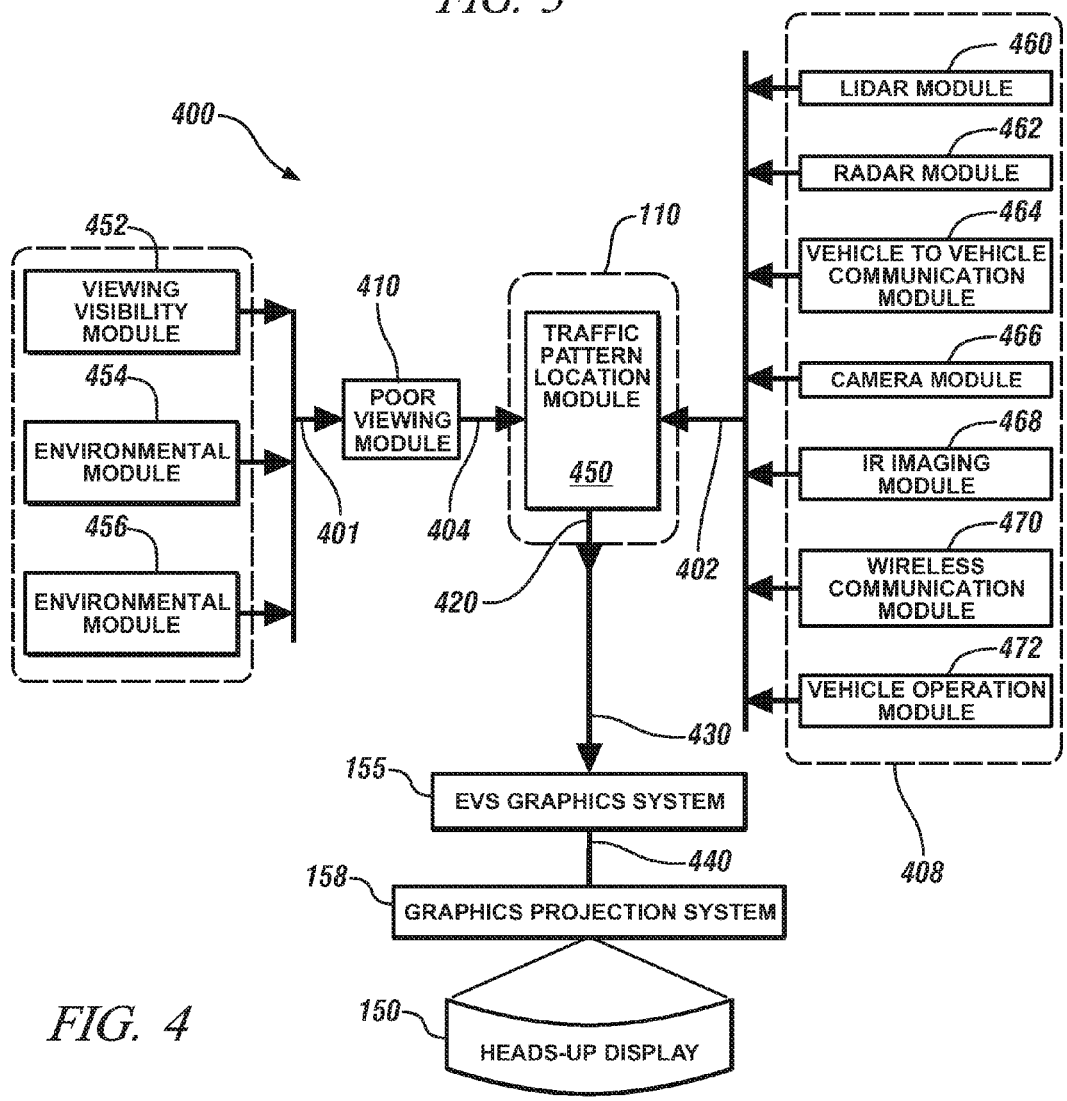
FIG. 4 illustrates an exemplary control scheme to represent a traffic pattern location during poor viewing conditions, in accordance with the present disclosure.

Referring to FIG. 4, an illustration of an exemplary control scheme 400 to monitor driving viewing conditions of the vehicle, detect poor viewing conditions based on the monitored driving viewing conditions, monitor a traffic pattern location and determine a graphic representing the traffic pattern location based on the monitored traffic pattern location and the detected poor viewing conditions is illustrated in accordance with the present disclosure. A traffic pattern location module (TPLM) 450 associated with the EVS system manager 110 analyzes vehicular environment data inputs 402 to monitor the traffic pattern location and determine the graphic representing the traffic pattern location 420 when poor viewing conditions are detected. The TPLM 450 utilizes the data inputs 402 from a plurality of vehicular environment data modules 408 to monitor the vehicular environment. It should be appreciated that each of the plurality vehicular environment data modules 408 can be utilized alone or in unison with other vehicular environment data modules depending on the application in monitoring the vehicular environment to generate vehicular environment data inputs 402 utilized by the TPLM 450 to monitor and provide a representation of the traffic pattern location 420 when poor viewing conditions are detected. The plurality of vehicular environment data modules 408 can include data from a lidar module 460, data from a radar module 462, data from vehicle to vehicle communication module (V2VM) 464, data from a camera module 466, data from an IR imaging module 468, data from a wireless communications module 470 and data from a vehicle operation module (VOM) 472. Radar and lidar data can be referred to as range data from the radar system 125 and the lidar system 127 of FIG. 1, respectively. Likewise, IR imaging data and camera data can be referred to as image data from the camera system 120 and the IR imaging device 137 of FIG. 1, respectively. The wireless communications module 470 communicates with resources outside of the vehicle, for example, satellite system 180 and cellular communications tower 190. Data from the internet can be obtained from the wireless communication system 145. However, this disclosure is not limited to these data modules. The V2VM 464 includes utilizing GPS data from the GPS device 140 in conjunction with 3D map data, wireless communication system 145, the satellite system 180 and the cellular communications tower 190. The VOM 472 can include the exemplary vehicle speed sensor 130 (FIG. 1) to represent such an in-vehicle sensor describing vehicle operation.

A poor viewing module (PVM) 410 generates a detected poor viewing condition input 404 to the TPLM 450 based on monitored viewing condition inputs 401 generated by a plurality of viewing data modules 406. The plurality of viewing data modules 406 includes a viewing visibility module 452, an environmental luminance module 454 and a weather condition module 456. The viewing visibility module 452 can include image data from the camera system 120 and the IR imaging device 137 of FIG. 1. The environmental luminance module 454 can include calendar, GPS data from the GPS device 140 in conjunction with 3D map data, light sensors and information from the wireless communication system 145. The weather condition module 456 can communicate with resources outside of the vehicle, for example, satellite system 180 and cellular communications tower 190 to monitor weather conditions. Data from the internet can be obtained from the wireless communication system 145 to monitor weather conditions.

Control system 400 further includes the EVS system manager 110 monitoring information from the TPLM 450 and generating display requirements 430 based on the traffic pattern location 420 generated by the TPLM 450 when poor viewing conditions are detected, EVS graphics system 155 monitoring the display requirements 430 from the EVS system manager 110 and generating graphics commands 440, and a graphics projection system 158 projecting light upon a head-up display 150.

Poor viewing conditions can include any condition which affects or diminishes the operator or occupant of the vehicle's visibility of the driving scene. For instance, viewing conditions can be detected as poor during nighttime, dusk and dawn. Additionally, viewing conditions can be detected as poor during adverse weather conditions such as rain, snow and fog. Viewing conditions can also be determined as poor when a vehicle is travelling through a tunnel or other hindrance that may affect viewing conditions.

It is further appreciated that the traffic pattern location corresponds to the location of vehicle traffic along a roadway within the operating environment of the vehicle. Specifically, the traffic pattern location refers to the specific location of other vehicles in the operational environment of the vehicle.

Embodiments envisioned include utilizing monitored viewing condition inputs 401 generated by the plurality of viewing data modules 406 to detect poor viewing conditions. The TPLM 450 associated with the EVS system manager 110 is utilized to analyze the vehicular environment data inputs 402 to monitor and provide a representation of the traffic pattern location 420 when poor viewing conditions are detected. The EVS graphics system 155 thereby determines the graphic representing the traffic pattern location and a location of the graphic is dynamically registered upon the substantially transparent windscreen head-up display corresponding to the driving scene. The graphics projection system 158 displays the graphic onto the driving scene of the vehicle utilizing the head-up display 150 to enhance the driving experience.

Embodiments envisioned include monitoring driving viewing conditions based upon monitoring viewing visibility utilizing the viewing visibility module 452. In an exemplary embodiment, monitoring viewing visibility can include utilizing image data from the camera system 120 and can include utilizing image data from the IR imaging device 137. It is further appreciated that the image data from both the camera system 120 and the IR imaging device 137 can be fused together to monitor driving viewing conditions. In an exemplary embodiment, monitoring viewing visibility can include monitoring image data and monitoring range data from the radar system 125 and/or the lidar system 127, respectively. The image data and the range data can be compared, wherein viewing visibility can be determined based on the comparing. The comparing can be beneficial because the image data may not detect an object that the range data can detect. The comparing can be utilized to illustrate that the viewing visibility may be objectionable because the image data is unable to detect an object that the range data has detected.

The monitored viewing visibility can then be compared to a visibility threshold. Poor viewing conditions can be detected when the monitored viewing visibility violates the visibility threshold. The visibility threshold can be selected to correspond to an acceptable viewing distance that does not indicate poor viewing. It will be appreciated that the monitored viewing visibility corresponds to the monitored viewing condition input 401 received by the PVM 410, wherein the PVM 410 detects poor viewing conditions when the monitored viewing condition inputs 401 violate the visibility threshold.

Embodiments envisioned further include monitoring driving viewing conditions based upon monitoring luminance of an environment surrounding the vehicle utilizing the environmental luminance module 454. For instance, monitoring luminance of the environment surrounding the vehicle can include determining whether it is daytime or nighttime. The monitored luminance of the environment surrounding the vehicle can be compared to a luminance threshold. Poor viewing conditions can be detected when the monitored luminance of the environment surrounding the vehicle violates the luminance threshold. In a non-limiting example, the luminance threshold can be a level of luminance indicative of dusk, wherein luminance levels less than the luminance threshold indicate that it is dark outside, and thus, poor viewing conditions can be detected. In an exemplary embodiment, monitoring the luminance of the environment surrounding the vehicle can include utilizing GPS data in conjunction with 3D map data and a calendar to determine the level of luminance surrounding the vehicle at the vehicle's present location for the given time and day of the year. In another exemplary embodiment, light sensors can be utilized to monitor the luminance of the environment surrounding the vehicle. It will be appreciated that the monitored luminance of the environment surrounding the vehicle corresponds to the monitored viewing condition inputs 401 received by the PVM 410, wherein the PVM 410 detects poor viewing conditions when the monitored viewing condition inputs 401 violate the luminance threshold.

In another exemplary embodiment, monitoring driving viewing conditions can include monitoring weather conditions of an environment surrounding the vehicle utilizing the weather condition module 456. Based on the monitored weather conditions, adverse weather conditions can be determined Poor viewing conditions can thereby be detected when the adverse weather conditions are determined. In an exemplary embodiment, monitoring weather conditions can include utilizing resources outside of the vehicle, for example, satellite system 180, cellular communications tower 190 and data from the internet obtained from the wireless communication system 145 to monitor weather conditions. GPS data in conjunction with 3D map data can be utilized in association with the resources outside of the vehicle monitor the weather conditions at the present location of the vehicle. In another exemplary embodiment, weather conditions can be monitored utilizing in-vehicle weather sensors that monitor the weather of the environment surrounding the vehicle. In a non-limiting example, when the monitored weather conditions indicate heavy fog, adverse weather conditions can be determined to thereby detect poor viewing conditions. In another non-limiting example, when the monitored weather conditions indicate rain, adverse weather conditions can be determined to thereby detect poor viewing conditions. In yet another non-limiting example, when the monitored weather conditions indicate snow, adverse weather conditions can be determined to thereby detect poor viewing conditions. It will be appreciated that the monitored weather conditions of the environment surrounding the vehicle corresponds to the monitored viewing condition inputs 401 received by the PVM 410, wherein the PVM 410 determines adverse weather conditions, thereby detecting poor viewing conditions.

Figure 5A:
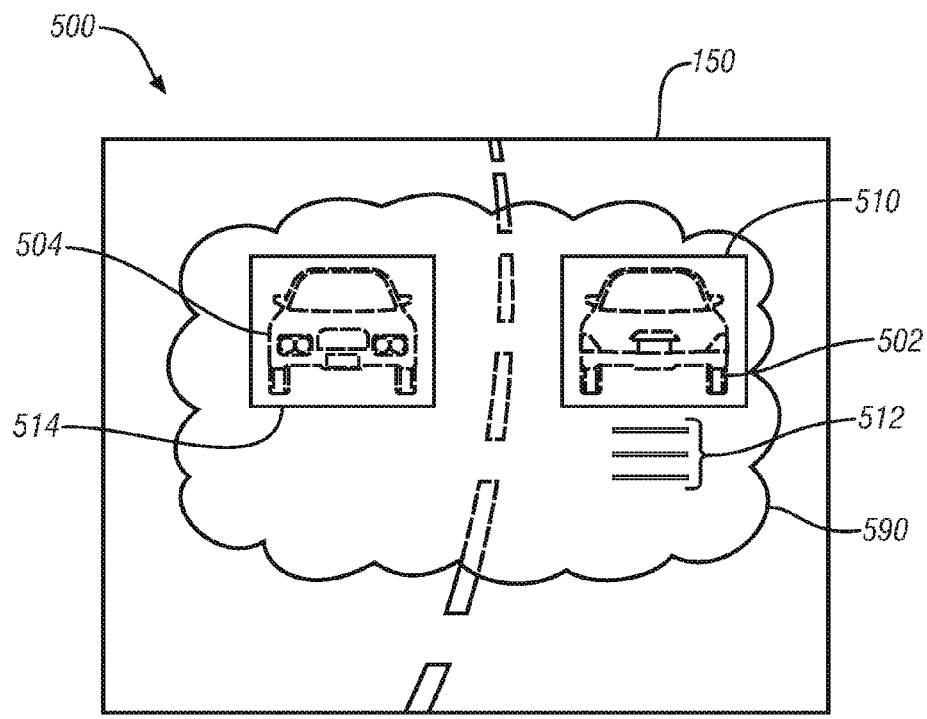
FIGS. 5A and 5B illustrate driving scenes including graphics dynamically registered upon a substantially transparent windscreen head-up display of a vehicle, in accordance with the present disclosure.

As aforementioned, embodiments envisioned include the TPLM 450 associated with the EVS system manager 110 to analyze vehicular environment data inputs 402 to monitor and determine a graphic representing the traffic pattern location 420 when poor viewing conditions are detected. The vehicular environment data inputs 402 correspond to the monitored traffic pattern location. In an exemplary embodiment of the present disclosure, the monitored traffic pattern location can include monitoring a direction of travel of vehicular traffic. It will be appreciated that any one of or combination of the plurality of vehicular environment data modules 408 can monitor the direction of travel of vehicular traffic. The determined graphic representing the traffic pattern location when poor viewing conditions are detected can include utilizing a graphic of a color corresponding to vehicular traffic travelling in a same direction as the vehicle. Additionally, the determined graphic representing the traffic pattern location when poor viewing conditions are detected can include utilizing a graphic of a second color corresponding to vehicular traffic travelling in an opposite direction as the vehicle. Referring to FIG. 5A, a driving scene 500 illustrated through a substantially transparent windscreen head-up display 150 of a vehicle when poor viewing conditions 590 are detected depicts a first vehicular traffic vehicle 502 travelling in the same direction as the vehicle, wherein a highlighted box graphic 510 of a first color (e.g., blue) is utilized to correspond to the first vehicular traffic vehicle 502 travelling in the same direction as the vehicle. A second vehicular traffic vehicle 504 travelling in opposite direction as the vehicle includes a second highlighted box graphic 514 of a second color (e.g, red) corresponding to the second vehicular traffic vehicle 504 travelling in the opposite direction as the vehicle.

Embodiments further envisioned include monitoring the traffic pattern location based upon monitoring vehicle to vehicle communication utilizing the V2VM 464. As aforementioned, monitoring the V2VM 464 can include utilizing GPS data in conjunction with 3D map data, wireless communication system 145, the satellite system 180 and the cellular communication tower 190. In an exemplary embodiment of the present disclosure, the V2VM 464 can be utilized to monitor a request for a current location of a second vehicle within an operational environment of the vehicle. The request from the first vehicle can be conveyed to the second vehicle for the current location of the second vehicle. The location of the second vehicle can be transferred from the second vehicle to the vehicle.

Figure 5B:
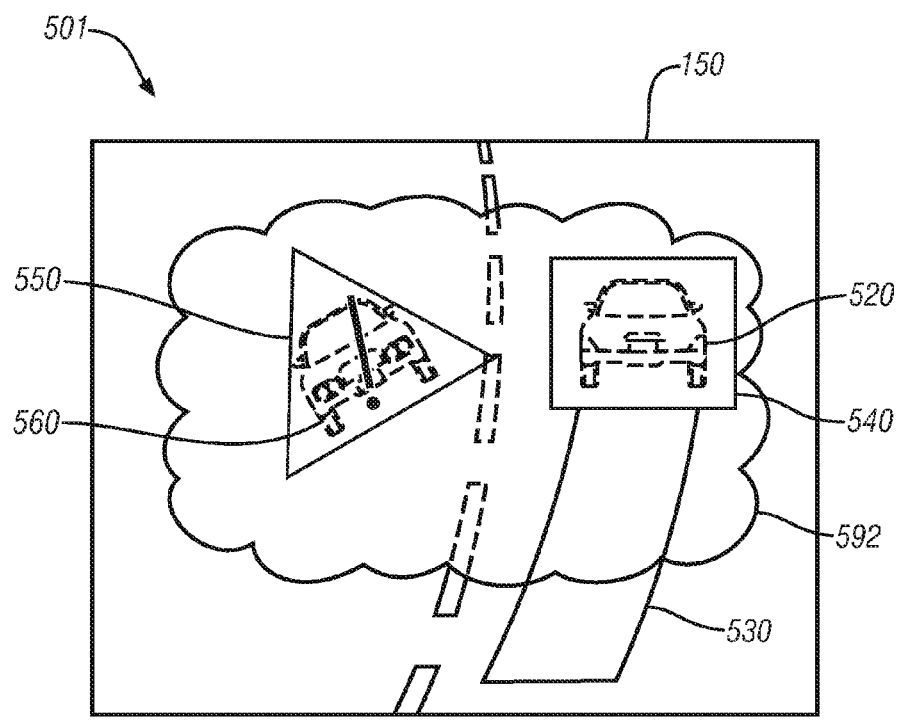

In another exemplary embodiment, the V2VM 464 can be utilized to detect an impending collision involving the vehicle and a second vehicle. The method can include analyzing the movement of the second vehicle transmitted within the vehicle to vehicle communication. The movement of the second vehicle can be determined to impinge upon a zone proximate to the vehicle. When the movement of the second vehicle is determined to impinge upon a zone proximate to the vehicle, a registered warning graphic can be utilized representing the movement of the second vehicle to impinge upon the zone proximate to the vehicle. Referring to FIG. 5B, a driving scene 501 illustrated through a substantially transparent windscreen head-up display 150 of a vehicle when poor viewing conditions 592 are detected depicts a second vehicle 560 impinging upon the zone proximate to vehicle, wherein a registered warning graphic 550 utilizing a triangle and exclamation point is used to represent the second vehicle 560 impinging upon the zone proximate to the vehicle.

Embodiments further envisioned to monitor the traffic pattern location can include monitoring operation of the vehicle and monitoring a range to a second vehicle. It will be appreciated that monitoring operation of the vehicle can include monitoring the speed of the vehicle utilizing the VOM 472 in association with the exemplary vehicle speed sensor. Monitoring the range to the second vehicle can include range data from one or both of the lidar and radar modules 460, 462 respectively. The monitored operation of the vehicle and the monitored range to the second vehicle corresponds to the vehicular environment data inputs 402 received to the TPLM 450 to determine the graphic representing the traffic pattern location 420 when poor driving conditions are detected. The TPLM 450 thereby determines a safe driving distance between the vehicle and the second vehicle based upon the monitored operation of the vehicle. The range to the second vehicle and the safe driving distance between the vehicle and the second vehicle are compared. The graphic representing the traffic pattern location 420 when poor viewing conditions are detected can include utilizing a graphic with a color corresponding to the position of the second vehicle relative to the vehicle being more distant from the vehicle than the safe driving distance. For instance, the highlighted box graphic 540 can utilize a color (e.g., green) corresponding to the position of the vehicular traffic vehicle 520 being more distant from the vehicle than the safe driving distance. The graphic representing the traffic pattern location 420 can further include utilizing a graphic with a second color corresponding to the position of the second vehicle relative to the vehicle being closer to the vehicle than the safe driving distance. For instance, the highlighted box graphic 510 can utilize a color (e.g., red) corresponding to the position of the vehicular traffic vehicle 502 being closer to the vehicle than the safe driving distance. Furthermore, a second graphic can be determined by the TPLM 450 representing the traffic pattern location 420 (i.e., the safe driving distance). The second graphic can include utilizing a polygon registered to a road surface between the vehicle and the second vehicle. For instance, a polygon registered graphic 530 is illustrated representing the traffic pattern location (i.e., the safe driving distance). Hence, when the vehicle is within the polygon registered graphic 530, the vehicle is impinging upon the safe driving distance. It will be appreciated that the second graphic is registered upon the substantially transparent windscreen utilizing the methods set forth above.

Referring back to FIG. 5A, a textual graphic 512 can be utilized representing the traffic pattern location based on the monitored traffic pattern location and the detected poor viewing conditions. For instance, the highlighted box graphic 510 encompassing the first vehicular traffic vehicle 502 can represent the traffic pattern location, whereas the textual graphic 512 could represent the speed of the vehicle. A location of the textual graphic 512 can be dynamically registered upon the substantially transparent windscreen head-up display 150 corresponding to the driving scene of the vehicle and displayed upon the head-up display 150 in the same manner as the graphics discussed above. It will be appreciated that none of the dynamically registered graphics discussed above are limited to any one embodiment and can be utilized in any situation to enhance representing the traffic pattern location when poor viewing conditions are detected.

The above disclosure describes a substantially transparent head-up display capable of full-screen display. It will be appreciated that similar methods can be employed upon windscreens utilizing a substantially full-windscreen display, a partial windscreen display, for example limited to the driver's half of the windscreen, or a display focused or limited to the straight-forward typical center of view of the operator. The disclosure is not limited to windscreens, but can include substantially transparent head-up displays that include side windows or a rear window of a vehicle. Graphics can additionally be projected upon pillars of the vehicle. Many embodiments of displays are envisioned, and the disclosure is not intended to be limited to the particular exemplary embodiments described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to dynamically register a graphic onto a driving scene of a vehicle utilizing a substantially transparent windscreen head-up display, comprising:
    monitoring driving viewing conditions of the vehicle;
    detecting poor viewing conditions based on the monitored driving viewing conditions;
    monitoring a traffic pattern location;
    determining a graphic representing the traffic pattern location based on the monitored traffic pattern location and the detected poor viewing conditions;
    dynamically registering a location of the graphic upon the substantially transparent windscreen head-up display corresponding to the driving scene of the vehicle; and
    displaying the graphic upon the substantially transparent windscreen head-up display at said location;
    wherein the substantially transparent windscreen head-up display comprises one of light emitting particles or microstructures over a predefined region of the windscreen permitting luminescent display while permitting vision therethrough.

2. The method of claim 1 further comprising monitoring an occupant eye location; and
    wherein dynamically registering the location of the graphic upon the substantially transparent windscreen head-up display corresponding to the driving scene of the vehicle is based upon the occupant eye location.

3. The method of claim 2 further comprising:
    monitoring a current orientation of the vehicle;
    monitoring a current location of the traffic pattern location; and
    wherein dynamically registering the location of the graphic upon the substantially transparent windscreen head-up display corresponding to the driving scene of the vehicle is further based upon the current orientation of the vehicle and the current location of the traffic pattern.

4. The method of claim 3 further comprising:
    monitoring an operator gaze location; and
    adding emphasis to the graphic based upon an increasing distance between the operator gaze location and the current location of the traffic pattern.

5. The method of claim 3 further comprising:
    monitoring a current location of the vehicle; and
    adding emphasis to the graphic based upon a decreasing distance between the current location of the vehicle and the current location of the traffic pattern location.

6. The method of claim 1 wherein monitoring driving viewing conditions of the vehicle comprises:
    monitoring viewing visibility;
    comparing the monitored viewing visibility to a visibility threshold; and
    wherein detecting poor viewing conditions based on the monitored driving viewing conditions comprises detecting poor viewing conditions when the monitored viewing visibility violates the visibility threshold.

7. The method of claim 6 wherein monitoring viewing visibility comprises:
    monitoring image data from a camera system;
    monitoring range data from range sensors; and
    determining the viewing visibility based on a comparison of the image data and the range data.

8. The method of claim 1 wherein monitoring driving viewing conditions of the vehicle comprises:
    monitoring luminance surrounding the vehicle;
    comparing the monitored luminance surrounding the vehicle to a luminance threshold; and
    wherein detecting poor viewing conditions based on the monitored driving viewing conditions comprises detecting poor viewing conditions when the monitored luminance surrounding the vehicle violates the luminance threshold.

9. The method of claim 1 wherein monitoring driving viewing conditions of the vehicle comprises:
    monitoring weather conditions of an environment surrounding the vehicle;
    determining adverse weather conditions based on the monitored weather conditions; and
    wherein detecting poor viewing conditions based on the monitored driving viewing conditions comprises detecting poor viewing conditions when adverse weather conditions are detected.

10. The method of claim 1 wherein monitoring the traffic pattern location comprises monitoring a direction of travel of vehicular traffic;
    wherein determining the graphic representing the traffic pattern location comprises determining a graphic of a first color corresponding to vehicular traffic travelling in a same direction as the vehicle, and determining a graphic of a second color corresponding to vehicular traffic travelling in an opposite direction as the vehicle.

11. The method of claim 1 further comprising detecting an impending collision involving the vehicle and a second vehicle based on monitoring a vehicle to vehicle communication;
    wherein monitoring a traffic pattern location is based upon the vehicle to vehicle communication, comprising:
        analyzing movement of the second vehicle transmitted within the vehicle to vehicle communication; and
        determining the movement of the second vehicle to impinge upon a zone proximate to the vehicle; and
    wherein determining the graphic representing the traffic pattern location based on the traffic pattern location and the detected poor viewing conditions comprises determining a registered warning graphic representing the movement of the second vehicle to impinge upon the zone proximate to the vehicle.

12. The method of claim 1 wherein monitoring the traffic pattern location comprises:

monitoring operation of the vehicle;
monitoring a range to a second vehicle;
determining a preferred minimum driving distance between the vehicle and the second vehicle based upon the operation of the vehicle; and
comparing the range to the second vehicle and the preferred minimum driving distance between the vehicle and the second vehicle;
wherein determining the graphic representing the traffic pattern location based on the monitored traffic pattern location and the detected poor viewing conditions comprises:
determining a first graphic with a first color corresponding to the position of the second vehicle relative to the vehicle being more distant from the vehicle than the preferred minimum driving distance, and a second color corresponding to the position of the second vehicle relative to the vehicle being closer to the vehicle than the preferred minimum driving distance.

13. The method of claim 12 further comprising:
determining a second graphic representing the traffic pattern location based on the monitored traffic pattern location and the detected poor viewing conditions, the second graphic comprising a polygon registered to a road surface between the vehicle and the second vehicle;
dynamically registering a location of the second graphic upon the substantially transparent windscreen head-up display corresponding to the driving scene of the vehicle; and
displaying the second graphic upon the substantially transparent windscreen head-up display.

14. The method of claim 1 wherein determining the graphic representing the traffic pattern location based on the monitored traffic pattern location and the detected poor viewing conditions comprises determining a highlighted box encompassing the traffic pattern location.

15. Method to dynamically register a graphic onto a driving scene of a vehicle utilizing a substantially transparent windscreen head-up display, comprising:
monitoring driving viewing conditions of the vehicle;
detecting poor viewing conditions based on the monitored driving viewing conditions;
monitoring a traffic pattern location comprising monitoring a direction of travel of vehicular traffic;
determining a graphic representing the traffic pattern location based on the monitored traffic pattern location and the detected poor viewing conditions comprising determining the graphic in a first color corresponding to vehicular traffic travelling in a same direction as the vehicle, and determining the graphic in a second color corresponding to vehicular traffic travelling in an opposite direction as the vehicle;
monitoring an occupant eye location;
dynamically registering a location of the graphic upon the substantially transparent windscreen head-up display corresponding to the driving scene of the vehicle based upon the occupant eye location; and
displaying the graphic upon the substantially transparent windscreen head-up display at said location;
wherein the substantially transparent windscreen head-up display comprises one of light emitting particles or microstructures over a predefined region of the windscreen permitting luminescent display while permitting vision therethrough.

16. The method of claim 15 further comprising:
determining a textual graphic representing the traffic pattern location based on the monitored traffic pattern location and the detected poor viewing conditions,
dynamically registering a location of the textual graphic upon the substantially transparent windscreen head-up display corresponding to the driving scene of the vehicle; and
displaying the textual graphic upon the substantially transparent windscreen head-up display.

17. System to dynamically register a graphic onto a driving scene of a vehicle utilizing a substantially transparent windscreen head-up display, comprising:
a substantially transparent windscreen comprising one of light emitting particles or microstructures over a predefined region of the windscreen permitting luminescent display while permitting vision therethrough;
an enhanced vision system system manager:
monitoring driving viewing conditions of the vehicle;
detecting poor viewing conditions based on the monitored driving viewing conditions;
monitoring a traffic pattern location;
determining a graphic representing the traffic pattern location based on the monitored traffic pattern location and the detected poor viewing conditions;
dynamically registering a location of the graphic upon the substantially transparent windscreen head-up display corresponding to the driving scene of the vehicle;
a graphics system generating the graphic representing the traffic pattern location based upon the dynamically registered location of the graphic; and
a graphics projection system communicating with the graphics system and displaying the graphic representing the traffic pattern location upon the substantially transparent windscreen head-up display.

* * * * *